United States Patent [19]

Nordskog

[11] Patent Number: 4,740,030

[45] Date of Patent: Apr. 26, 1988

[54] JUMP SEAT ASSEMBLY AND SEAT WITH IMPROVED SAFETY BELT ARRAY

[76] Inventor: Robert A. Nordskog, 18135 Karen Dr., Tarzana, Calif. 91356

[21] Appl. No.: 630,270

[22] Filed: Jul. 12, 1984

[51] Int. Cl.⁴ .......................... A47C 1/126; B60N 1/10
[52] U.S. Cl. ......................................... 297/13; 16/289; 16/306; 297/14; 297/43; 297/335
[58] Field of Search ...................... 297/13, 14, 43, 315, 297/331, 332, 333, 335, 484; 16/289, 303, 306

[56] References Cited

U.S. PATENT DOCUMENTS

| | | | |
|---|---|---|---|
| 694,163 | 2/1902 | Coursiere et al. | 297/315 |
| 1,110,695 | 9/1914 | Johnson | 297/43 |
| 1,135,647 | 4/1915 | Adler | 297/13 X |
| 1,210,789 | 1/1917 | Freedman | 297/335 X |
| 1,467,582 | 9/1923 | Lang | 297/331 |
| 1,747,717 | 2/1930 | Hummert | 297/335 X |
| 2,177,263 | 10/1939 | Noe | 297/14 |
| 3,059,964 | 10/1962 | Hoppe et al. | 297/13 |
| 3,865,434 | 2/1975 | Sully | 297/417 |
| 3,887,233 | 6/1975 | Garavaglia et al. | 297/484 |

FOREIGN PATENT DOCUMENTS

| | | | |
|---|---|---|---|
| 2108718 | 8/1972 | Fed. Rep. of Germany | 297/484 |
| 2222251 | 12/1972 | Fed. Rep. of Germany | 297/484 |
| 1440281 | 4/1966 | France | 297/484 |
| 22320 | of 1896 | United Kingdom | 16/289 |

*Primary Examiner*—Peter A. Aschenbrenner
*Assistant Examiner*—Peter R. Brown
*Attorney, Agent, or Firm*—John J. Posta, Jr.

[57] ABSTRACT

The improved assembly includes a jump seat with a raised back portion and a seat portion hinged thereto and spring raised automatic movement from a horizontal operative position to a raised stored position. The seat back portion holds such spring and is hinged to the vertical arm of an L-shaped wall bracket, which may contain a second spring so that when the seat portion is in the stored position, the seat can be controllably swung into a flat stored position against the wall bracket, which bracket is adapted to be secured to an airplane galley wall or the like. The horizontal portion of the bracket includes a raised post and recess with sloped walls easily releasably seating with and disengaging from the underside of the seat portion. The seat includes a fully adjustable safety belt array, having a pair of parallel vertical shoulder belts releasably separately hooked to a pair of transverse belts. The latter are each adjustable in length. The shoulder belts pass through openings in the seat back and spaced guideways, over a roller and down into a recessed take-up reel which winds them in side-by-side non-overlapping relation for minimal belt bulge. The assembly and array are inexpensive, durable and effective.

9 Claims, 3 Drawing Sheets

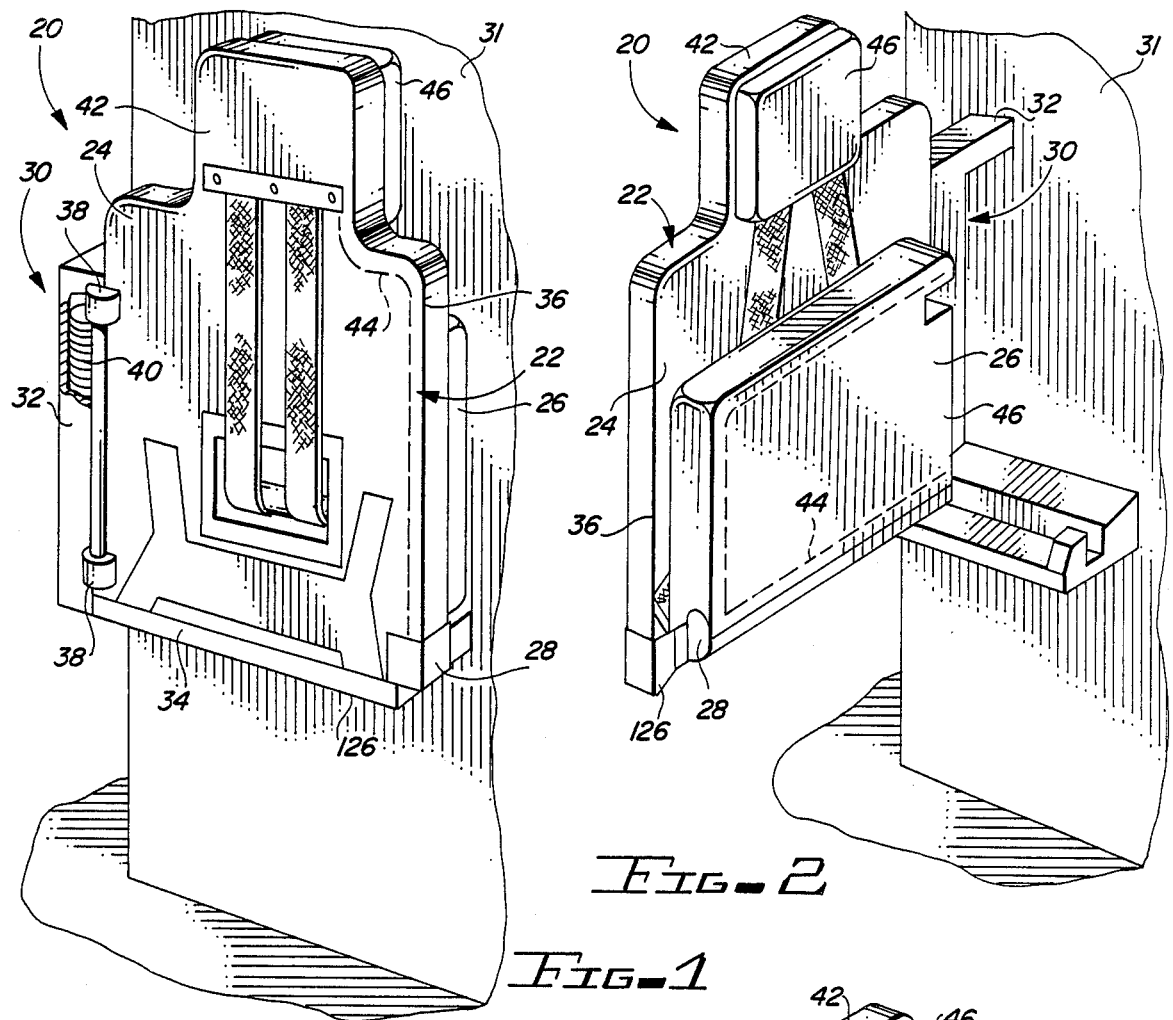
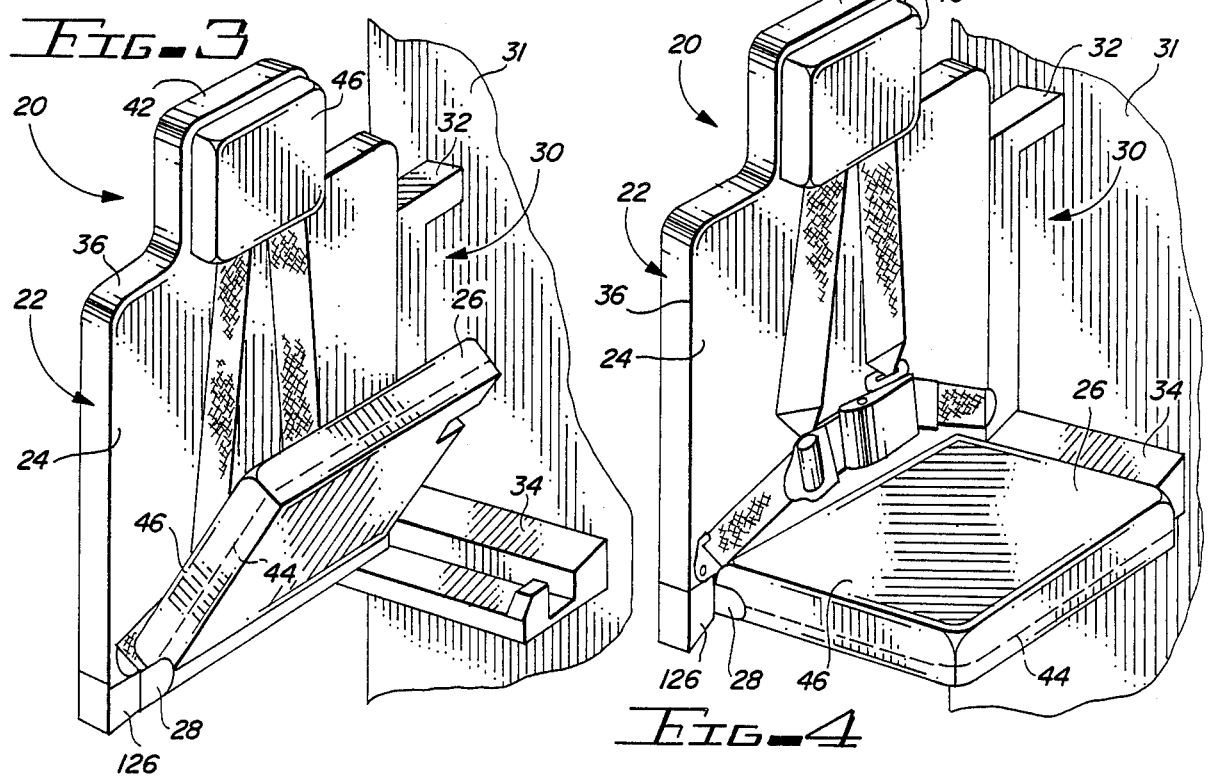
FIG-1  FIG-2  FIG-3  FIG-4

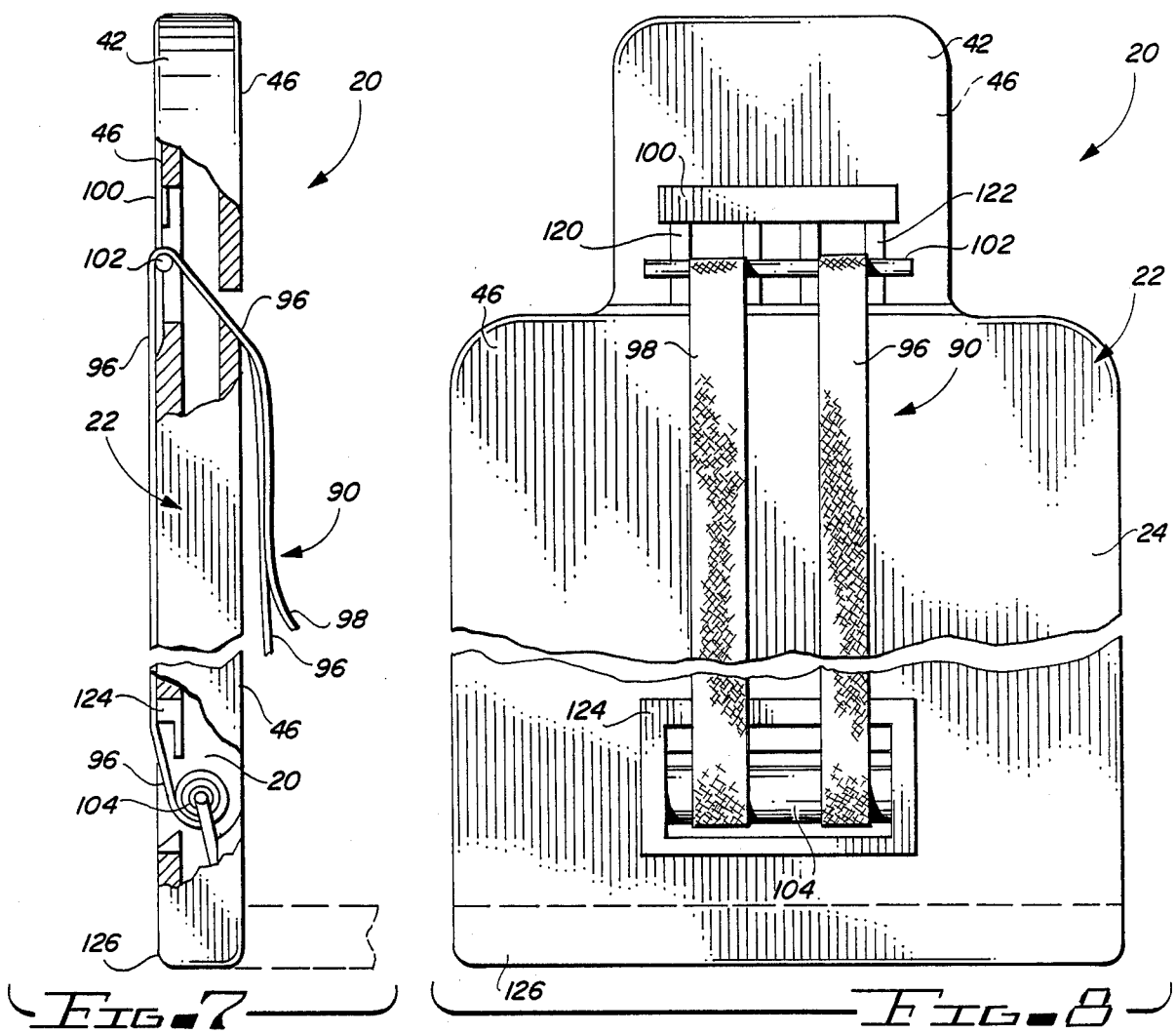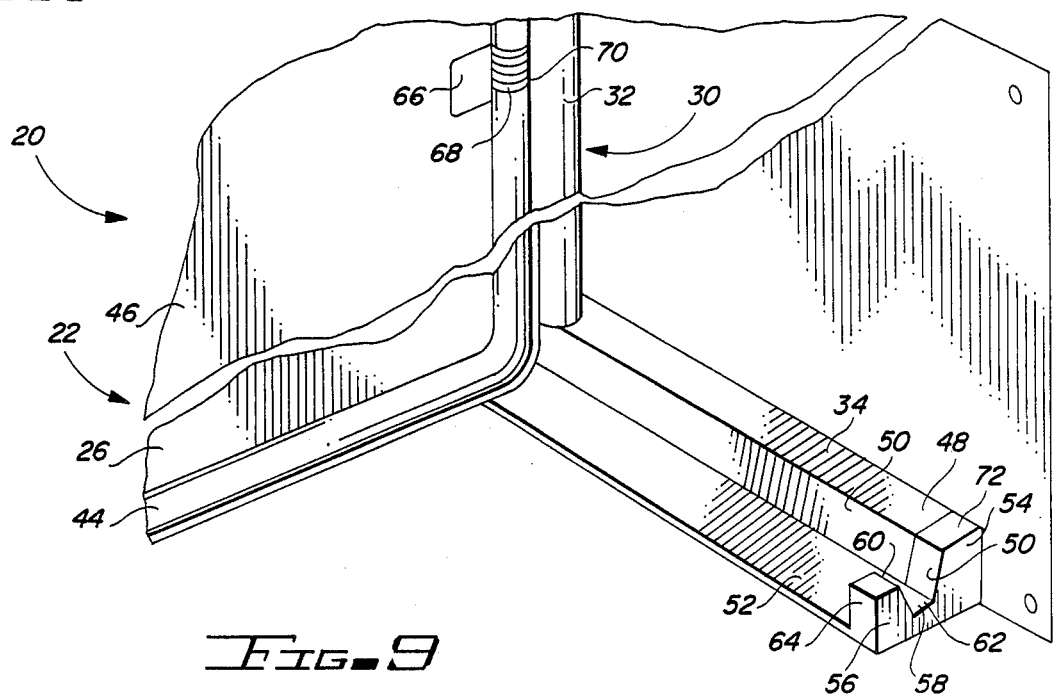

JUMP SEAT ASSEMBLY AND SEAT WITH IMPROVED SAFETY BELT ARRAY

BACKGROUND OF THE INVENTION

1. Field of the Invention

The present invention generally relates to seats and, more particularly, to an improved jump seat and to a safety belt array for the seat.

2. Prior Art

Jump seats have been connected to airplane galley walls and other plane interior partitions to provide seating room for flight attendants and the like during a plane's take-off and landing and during bumpy weather conditions. Such jump seats, however, usually are flimsy devices or are relatively bulky and require considerable attendant-assisted movement of the seat portion into and out of the operative position. Moreover, seat belt arrays for such jump seats are also bulky and clumsy and tend to interfere with proper storage of the seats, because the belt take-up reels, if any, wind multiple belts over one another, so that the wound belts bulge out of the seat. Space on crowded commercial airlines is at a premium, and the bulk, ease and efficiency with which jump seats can be stored and utilized determines their value.

There remains a need for a slim, flat jump seat which has improved seat stability in use, and which can be easily stored flat and as easily moved into operative position. Preferably, the seat should have an improved safety belt array which can fit flight attendants of all sizes and shapes and automatically reels up with minimum bulk so as not to interfere with flat storage of the jump seat. Such an array should also be adaptable to other seats, whether or not they are stowable.

SUMMARY OF THE INVENTION

The improved vehicle jump seat assembly and improved seat belt array of the present invention satisfy all the foregoing needs. The assembly and array are substantially as set forth in the Abstract above. Thus, the assembly comprises a jump seat having a raised back portion and a seat portion hinged thereto. A spring is secured in the seat back frame behind the seat portion and acts through a cam or crank arm to positively and automatically return the seat portion to the upright folded position when not in use. The seat back portion frame is hinged at the side thereof to the vertical arm of an L-shaped wall bracket adapted to be secured to an airplane galley sidewall, so that the seat with seat portion folded up can be swung flat against such sidewall in such bracket for storage. Preferably, the wall bracket contains a spring which controls such hinge action.

The wall bracket includes a horizontal arm with a sloped sidewall, a front raised post and a recess therebehind with sloped wall. With this arrangement, when the seat portion is swung down, the post fits into a cavity in the underside thereof and a portion of the seat frame fits into the bracket recess so that the seat portion is fully stable and supported. The seat portion automatically always moves into the raised position when not in use because the recess and preferably the post have sloped sidewalls, because the recess is lined with a nylon release strip and because the frame portion seated therein has a smooth hard wear-resistant collar.

The seat, whether it be a jump seat or fixed seat, includes the novel seat belt array of the present invention. The array comprises a parallel pair of shoulder belts releasably connected to separate ones of a pair of transverse waist belts. The shoulder belts are trained through parallel openings in the seat back portion, pass through parallel guideways in a guide fitting and over a roller, both of which are connected to the back of the seat back portion and terminate in side-by-side non-overlapping, non-bulging relation in a spring loaded take-up reel recessed in the back of the seat back portion. The transverse belts are each adjustable as to length so that the array fits all sizes and shapes of individuals, yet is inexpensive. It avoids bulking the belts which would interfere with the flat closing and storage of the assembly. Further features of the invention are set forth in the following detailed description and accompanying drawings.

DRAWINGS

FIG. 1 is a schematic rear perspective view of a preferred embodiment of the improved jump seat assembly of the present invention, shown with the assembly in the stored position;

FIG. 2 is a schematic side perspective view of the assembly of FIG. 1 shown in the partly unfolded position, with the jump seat thereof swung away from a galley sidewall to which the assembly wall bracket thereof is secured;

FIG. 3 is a schematic side perspective view of the assembly of FIG. 1 with the seat portion thereof being swung down;

FIG. 4 is a schematic side perspective view of the assembly of FIG. 1 shown in the fully deployed operative position, with the seat portion thereof horizontal;

FIG. 7 is a schematic fragmentary side elevation, partly broken away, of the seat belt array of FIG. 1;

FIG. 8 is a schematic rear elevation of the seat belt array of FIG. 1;

FIG. 9 is an enlarged schematic perspective view of the horizontal wall bracket arm of FIG. 1, with a part of the seat portion of FIG. 1 in the folded upraised position;

DETAILED DESCRIPTION

FIGURES 1-4

Figure 5:
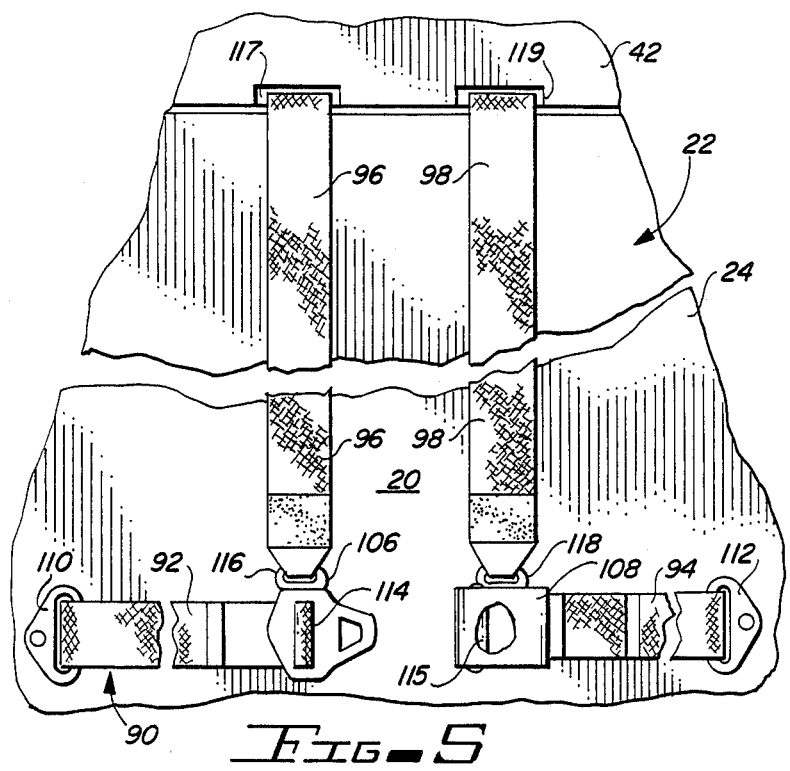
FIG. 5 is a schematic fragmentary front elevation of the improved seat belt array of FIG. 1.
Figure 6:
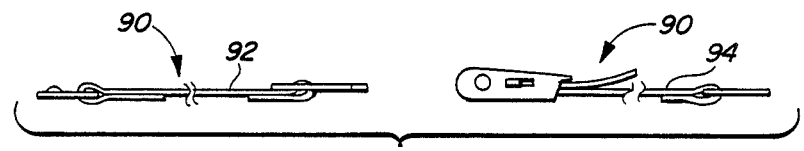
FIG. 6 is a schematic fragmentary top plan view of the transverse seat belts of FIG. 1.

Now referring more particularly to FIGS. 1-4 of the accompanying drawings, a preferred embodiment of the improved jump seat assembly of the present invention is schematically depicted therein. Thus, assembly 20 is shown, which comprises a jump seat 22 having a vertical back rest portion 24 and a seat portion 26 hinged thereto, as by a seat bracket 28 for rotation between the stored vertical position of FIGS. 1 and 2 and the operative horizontal position of FIG. 4. FIG. 3 shows seat portion 26 between the position of FIGS. 1 and 2 and that of FIG. 4.

Seat 22 is secured to an L-shaped wall bracket 30 mountable on the sidewall 31 of a plane galley or the like and bracket 30 has a vertical arm 32, from the lower end of which horizontal arm 34 extends forward. Back rest 24 has a tubular frame 36, the side portion of which is connected to arm 32 by spaced hinges 38. Hinges 38 can, if desired, be limit hinges, preventing seat 22 from pivoting beyond the position shown in FIG. 2, and can be connected, if desired, to a spring 40 in arm 32 which helps pivot seat 22 to the fully stored position of FIG. 1 from that of FIG. 2 and which itself act as hinge limit means.

Back rest 24 includes an upper head rest section 42. Seat portion 26 includes a tubular frame 44. Both back rest 24 and seat portion 26 may be covered with soft comfortable cushioning, padding 46 or the like.

FIGURES 9-11

Now referring to FIG. 9 of the drawings, it will be seen that horizontal arm 34 includes sloped top surface 48 and sloped side surface 50, as well as a horizontal bottom 52. The front end 54 of arm 34 includes an upraised post 56 spaced from surface 50 to provide therewith a recess 58 having upwardly diverging sidewalls 50 and 60. The bottom 62 of recess 58 may, if desired, be raised above bottom 52. Post 56 preferably has upwardly converging sidewalls 60 and 64.

When seat portion 26 is brought to the horizontal stable seat position of FIG. 4, post 56 seats in a cavity 66 in the underside 68 of seat portion 26 while portion 68 (FIG. 9) of, seat frame 44 rests in recess 58. Thus, seat portion 26 is firmly secured in bracket 30. Portion 68 preferably has a smooth hard anti-wear collar 70 of steel or the like while recess 58 preferably is ccvered with a slick quick release material such as nylon tape 72.

Figure 10:
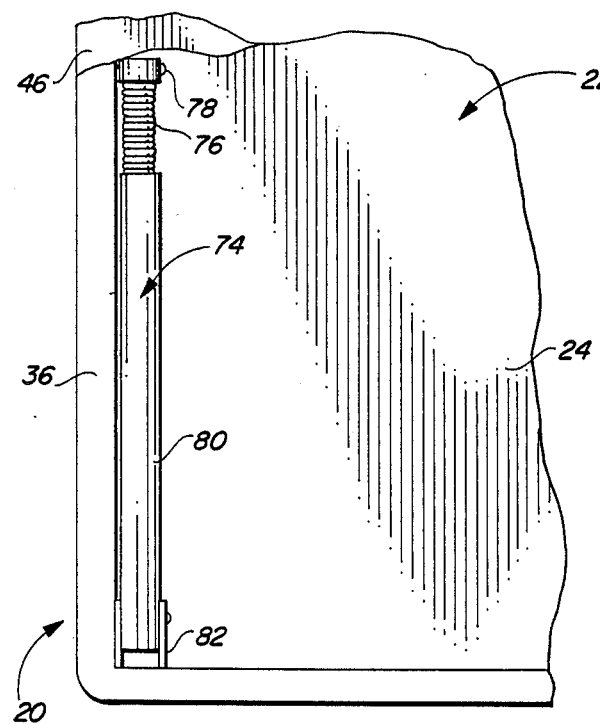
FIG. 10 is a schematic fragmentary rear elevation partly broken away, of the seat back portion of the seat of FIG. 1, illustrating the position of a spring for automatically raising the seat portion of the seat of FIG. 1; and, FIG. 11 is a schematic fragementary side elevation, partly broken away, of the seat back and seat portions of the seat of FIG. 1, illustrating the spring of FIG. 10.
Figure 11:
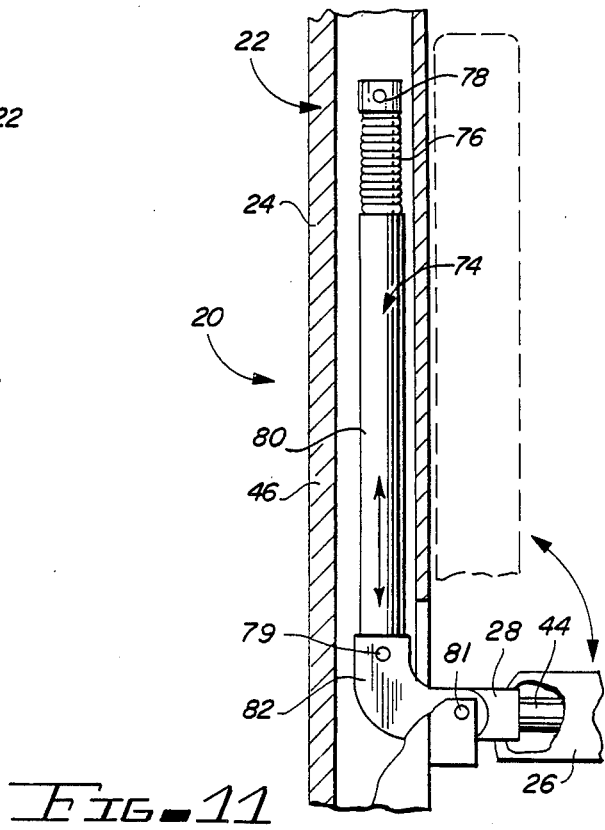

The upwardly diverging sidewalls 50 and 60 of recess 58 assure that when seat portion 26 is not in use, it will not stick in recess 58 but will automatically and freely swing up to the position shown in FIGS. 1 and 2. The described automatic action is effected by the spring and cam arrangement schematically shown in FIGS. 10 and 11. Thus, in those figures, back rest 24 is shown, the interior of which has a vertically aligned spring mechanism 74, including a compression spring 76 secured at its upper end to bracket 78 connected to frame 36 and the lower portion of which is connected to a drive or guide cylinder 80. The lower end of cylinder 80 is pivotally connected at pivot 79 to a cam or crank arm 82, which extends downwardly and forwardly of spring 76 and cylinder 80 and is fixedly secured to seat bracket 28, as shown in FIG. 11. Seat bracket 28 extends outside of backrest 24 and is fixedly secured to seat frame 44. Arm 82, seat bracket 28 and seat frame 44 are connected to one another and act in unison as a single unit pivotable about pivot 81 which is secured forwardly of backrest 24. Alternatively, arm 82 can be fixedly connected to the rear transverse portion of seat frame 44. Downward urging of cylinder 80 by spring 76 automatically causes cam arm 82 to force bracket 28 and seat portion 26 about pivot 81 to rotate to the vertical stored position of FIGS. 1 and 2.

When a person pulls down seat portion 26 to the position of FIG. 4 and sits in it, spring 76 is compressed by cylinder 74, such compression being relieved in spring 76, causing it to return to its normal length when the person rises from seat portion 26, thus effecting the desired automatic return of seat portion 26 to the raised vertical stored position of FIGS. 1 and 2.

FIGURES 5-8

Now referring more particularly to FIGS. 5-8, the improved seat belt array of the present invention is schematically depicted therein. Thus, belt array 90 is shown which comprises a pair of transverse waist belts 92 and 94, a pair of shoulder belts 96 and 98 releasably connected thereto, a belt guide 100, a belt roller 102 and a belt take-up reel 104.

Belts 92 and 94 are releasably connected to each other by a conventional ring fitting 106 connected to belt 92 and releasably secured to a flip clamp fitting 108 connected to belt 94. Belts 92 and 94 are also fixedly secured to seat back 24 by end fittings 110 and 112 and are each adjustable in length, ring fitting 106 and clamp fitting 108 having friction rollers 114 and 115 around which belts 92 and 94 are trained.

Belts 96 and 98 are releasably secured to belts 92 and 94, respectively, by releasable fittings 116 and 118 received in fittings 106 and 108, respectively, as shown in FIG. 5. Belts 96 and 98 rise parallel to each other from belts 96 and 98 and pass rearwardly through parallel slots 116 and 118 extending through head rest 42, then through parallel openings 120 and 122 in belt guide 100 secured to the back of headrest 42, and over free-spinning guide roller 102 connected to headrest 42. Belts 96 and 98 then pass down in parallel array to fitting 124 recessed in the lower portion of the back of back rest 24, and around spring-loaded take-up reel 104 rotatably secured in fitting 124. Since belts 96 and 98 remain in non-overlapping parallel relation on reel 104, back rest 24 can be made relatively thin and yet have belts 96 and 98, when rolled up on reel 104, still not appreciably bulge out from the back of rest 24, thereby permitting seat 22 to maintain a slim, flat stored position.

It will be understood that reel 104 can have, if desired, a stop position built into it so that belts 96 and 98 are not automatically reeled up any farther than, for example, the position shown in FIG. 7; that is, not back into or through slots 117 and 119.

Assembly 20 can be made of durable light weight materials, for example, aluminum or thin guage steel for brackets 28 and 30, frames 36 and 44, fittings 106, 108, 110, 112, 116, 118 and 124, guide 100, roller 102, reel 104 and other components. Seat 22 can be of slim but fully padded design for comfort and easy storage. Moreover, the lower end 126 of seat 22 is shaped relative to sloped surfaces 48 and 50 and bottom 52 of bracket arm 34 such that seat 22 snugly releasably frictionally locks in place in the stored position in bracket 30, as shown in FIG. 1, aided by the closing action of spring 40, if present, but can be readily opened by tugging with the fingers and can be swung to the operative position of FIG. 4 with little effort, as previously described. Accordingly, assembly 20 is durable, compact, efficient and inexpensive.

Various modifications, changes, alterations and additions can be made in the improved seat assembly of the present invention, its components and parameters and in the improved seat belt array of the present invention, its components and parameters. All such modifications, changes, alterations and additions as are within the scope of the appended claims form part of the present invention.

What is claimed is:

1. An improved vehicle jump seat assembly, said assembly comprising, in combination:

(a) a jump seat, including a raised back portion and a seat portion hinged to said back portion for movement between a horizontal operative position wherein the back portion and seat portion are disposed perpendicular to the wall and a vertical stored position wherein the back portion and seat portion overlie one another and both lie flat against the wall;

(b) a wall bracket comprising a generally upstanding arm and a generally horizontal arm interconnected thereto, said arms being adapted for mounting on a vehicle wall, said upstanding arm including hinge means connected to the side of said back portion of said jump seat for movement of said jump seat between a stored position in such bracket against a vehicle wall and an operative position extending laterally of said bracket and vehicle wall, (c) back portion spring return means interconnecting said upstanding arm and said back portion which moves said back portion to a stored position, (d) said horizontal arm including a sloped side surface for reception and support of the side margin of said seat portion, and further including a raised seat anchoring post adapted to fit into a cavity in the underside of side seat portion when said seat portion is in the operative position, said post defining with said sloped side surface a recess with sloped sidewalls, said recess being adapted to receive a frame component on the underside of said seat portion, said sloped sidewalls facilitating immediate, automatic easy release of said seat portion from said horizontal arm when a predetermined weight is removed from said seat to thereby store said jump seat against said vehicle wall, with both the jump seat and jump seat back both overlying one another and both lying flat against said wall, (e) seat portion spring return means interconnecting said seat portion and said back portion which raises said seat portion to a position where it overlies said back portion, (f) whereby said jump seat assembly includes sufficient support means to enable said jump seat, when in its operative position, to extend outwardly from and be supported entirely by said vehicle wall.

2. The improved assembly of claim 1 wherein said recess is lined with a smooth, fast release component and wherein said seat frame component receivable in said recess includes a smooth wear-resistant component.

3. The improved assembly of claim 2 wherein said fast release component comprises a strip of nylon tape and wherein said wear-resistant component includes a polished hardened steel collar.

4. The improved assembly of claim 1 wherein said upstanding arm includes limit means connected to said hinge means to control the rate and extent of movement of said seat between said stored and operative position.

5. The improved assembly of claim 4 wherein the rear end of said seat portion is pivotably connected by a bracket to the bottom of said back rest portion and wherein said seat spring means includes a compression spring connected to said back rest portion behind said seat portion, a drive arm connected to said spring and a cam member pivoted to said drive arm and extending down and forward into connection with at least one of said seat portion and seat portion bracket for rotating said seat portion bracket and seat portion.

6. The improved assembly of claim 1 wherein said assembly includes a fully adjustable seat belt sub-assembly connected to said seat back portion, said sub-assembly including a transversely extending waist-girdling belt portion, and a spaced pair of generally vertically depending shoulder belts separately releasably connected thereto and a spring loaded belt take-up reel recessed in the back of said seat back portion, said reel reeling said vertically depending shoulder belts in side-by-side non-overlapping relationship for minimal belt bulge to facilitate storage of said assembly.

7. The improved assembly of claim 6 wherein seat back portion includes a head rest and wherein said seat belt sub-assembly includes a belt strap guide having a bracket secured to said seat back portion at about said headrest, said bracket having a spaced parallel pair of belt guideways aligned with openings extending forwardly through said seat back portion and a free spinning transverse roller secured to the back of said seat back over said guideways, over which roller said vertical shoulder belts are trained to pass forward through said guideways and seat back openings and down in front of said seat back into releasable connection with said waist girdling belt portion.

8. The improved assembly of claim 7 wherein said waist girdling belt portion includes a pair of transverse belts fixedly secured to said seat back portion and releasably secured to each other, each said transverse belt including means for separately adjusting its length and being releasably connected to a separate one of said shoulder belts.

9. The improved assembly of claim 8 wherein said jump seat is an airplane jump seat adopted to be connected to an airplane galley sidewall, wherein said upright arm is vertical and said wall bracket is metal, and wherein said jump seat has a tubular metal frame.

* * * * *